Figure 1:
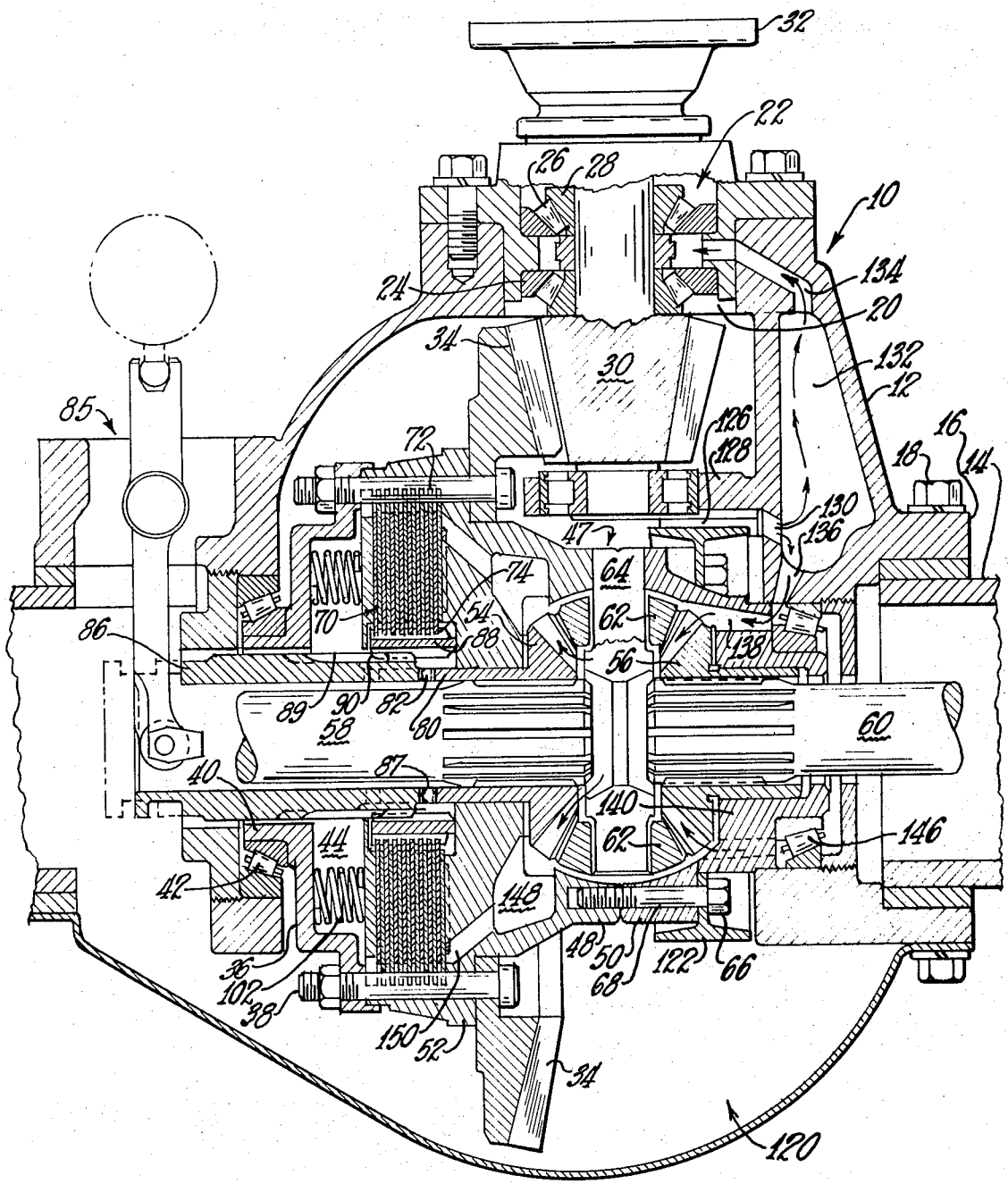

United States Patent
Wilder et al.

[11] 3,762,503
[45] Oct. 2, 1973

[54] LUBRICATION SYSTEM FOR LIMITED SLIP DIFFERENTIAL

[75] Inventors: William H. Wilder, Lyndhurst; Ivan E. Benjamin, East Cleveland, both of Ohio

[73] Assignee: Eaton Yale & Towne Inc., Cleveland, Ohio

[22] Filed: Apr. 14, 1971

[21] Appl. No.: 134,065

Related U.S. Application Data

[63] Continuation of Ser. No. 841,088, July 11, 1969, abandoned.

[52] U.S. Cl. ............... 184/6.12, 74/711, 192/113 B
[51] Int. Cl. ............................................. F16h 1/44
[58] Field of Search .................. 192/113.2; 184/6, 184/6.12; 74/710.5, 711

[56] References Cited
UNITED STATES PATENTS

| | | | |
|---|---|---|---|
| 3,448,635 | 6/1969 | Nelson | 184/6.12 X |
| 3,547,235 | 12/1970 | Weinrich | 192/113 B X |
| 3,198,295 | 8/1965 | Fangman et al. | 192/113 B |
| 3,153,464 | 10/1964 | Nelson et al. | 184/6 X |
| 3,202,253 | 8/1965 | Merritt et al. | 192/113 B |
| 3,366,210 | 1/1968 | Webster | 192/113 B |
| 3,366,211 | 1/1968 | May | 192/113 B |

*Primary Examiner*—Manuel A. Antonakas
*Attorney*—Teagno & Toddy

[57] ABSTRACT

Limited slip differential which is selectively engageable and includes an improved lubrication system. The limited slip mechanism uses a spring loaded friction disk clutch pack which can break away at excessive torque levels and prevent axle shaft breakage. The novel lubrication system provides improved lubrication of the clutch pack under all operating conditions and prolongs the life of the clutch pack.

2 Claims, 2 Drawing Figures

INVENTORS
WILLIAM H. WILDER &
BY IVAN E. BENJAMIN

ATTORNEYS

LUBRICATION SYSTEM FOR LIMITED SLIP DIFFERENTIAL

This application is a continuation of Ser. No. 841,088 filed July 11, 1969 now abandoned.

This invention relates to a limited slip differential particularly adapted for use in a vehicle interaxle, to positively transmit torque to each of the driving wheels of the vehicle, such as a truck. More particularly this invention relates to a selectively engageable limited slip differential, using a preloaded friction disk clutch pack and incorporating an improved lubrication system for lubricating the bearings and more importantly the clutch pack for increased life.

The advantage of a limited slip differential is that improved vehicle traction is provided by its use. Thus, if one wheel of the vehicle is on a slippery surface and the other on a dry surface, the one wheel will not spin out as in a normal differential. Instead, a limited slip differential will transfer torque to the other wheel and the vehicle will be able to move.

Spring loaded clutch packs have been used in the past to provide limited slip differential action. The spring loading provides a safety feature that lets the clutch pack break away and prevents excess stress on the axle shaft.

Application Ser. No. 626,216 filed Mar. 27, 1967 now U.S. Pat. No. 3,448,635 to which reference is made, discloses a spring loaded friction clutch limited slip differential that is an improvement over the prior art in that it is engageable as needed. In the prior art, the unit was constantly engaged. This produced extremely high wear on the clutch plates which scrubbed against each other to at least some degree during the entire time the vehicle was running. In the said U.S. Pat. No. 3,448,635 a lubrication system is disclosed which provides lubricant to the clutch pack as well as to the bearings and the gears of the differential.

The present invention provides an improvement to the lubrication system of U.S. Pat. No. 3,448,635 and produces more positive lubrication to the clutch pack.

Accordingly, it is an important object of this invention to provide an improved lubrication system for a limited slip differential using a spring loaded clutch pack.

Figure 2:
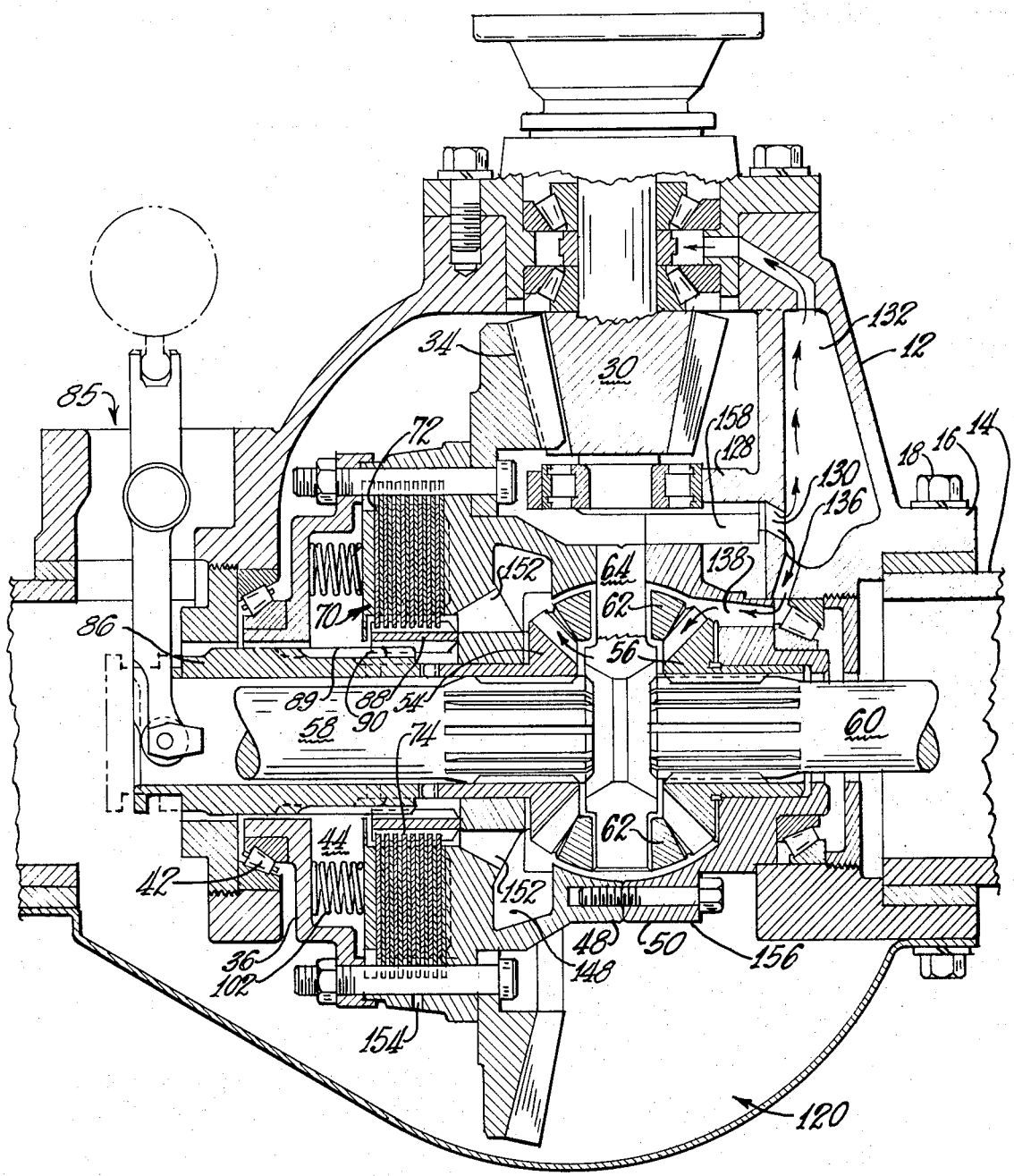

FIG. 1 is a sectional view of a differential mechanism as described in application Ser. No. 626,216 now U.S. Pat. No. 3,448,635; and FIG. 2 is a sectional view similar to FIG. 1 but showing the improved lubrication system of the present invention.

THE PRIOR ART

As shown in FIG. 1, the limited slip differential 10 is enclosed within a housing 14. A differential carrier 12 is fastened to housing 14 by means of a flange 16 and bolts 18. In the differential carrier 12 is an opening 20 that receives a bearing assembly 22, consisting of two roller bearings 26, each including an outer race 24 and an inner race and rollers 28. The two inner race and rollers 28 rotatably support the input pinion gear 30 which is connected by adapter flange 32 to a drive shaft not shown.

A ring gear 34 meshes with input pinion gear 30 and is connected to and rotatably supported on a cup-shape differential case 47 by bolts 38. The bolts 38 also hold a differential case cover 36 in place. The differential case cover 36 has an axially extending hub 40 which is rotatably supported in the differential carrier 12 by a roller bearing 42. The right hand side of differential case 47 is supported in a bearing 146. The differential case 47 and ring gear 34 together define a chamber 44 which receives a differential mechanism.

The differential case 47 comprises two halves 48 and 50. The half 48 includes a flange 52 to which the ring gear 34 is fastened. Differential side gears 54 and 56 are splined on axle shafts 58 and 60 and mesh with pinion gears 62. Pinion gears 62 are rotatably mounted on differential pinion gear shafts 64, the ends of which are fastened to differential case 47 for rotation therewith. The two halves 48 and 50 of the differential case 47 are held together by bolts 66 through holes 68 of half 50 and into threaded holes in the half 48.

The friction clutch pack 70 is positioned within the chamber 44. Friction disks 72 are spline connected at the outside diameter in suitable manner to the left half 48. Friction disks 72 thus rotate with the ring gear 34. Between alternate friction disks 72 are interposed friction disks 74 which are splined on their inside diameters to an annular, intermediate gear 88. The friction disks 74 thus rotate with the annular intermediate gear 88. Disks 72 and 74 are loaded together by compression springs 102.

Hub 80 of the side gear 54 extends into chamber 44 and has teeth 82. Selectively actuatable clutch 85 includes a sliding annular clutch member 86. Teeth 87 thereon are adapted to engage teeth 82 of the side gear 54. Also, intermediate annular gear or friction plate driver 88 has teeth 90, which engage teeth 89 of the sliding clutch member 86. When the sliding clutch member 86 is moved to the right in FIG. 1, teeth 87 and 82 engage.

In the left hand position (dotted) of FIG. 1, the teeth 87 and 82 are disengaged, although there is some overlap of teeth 89 and 90 so that the annular gear 88 and clutch sleeve 86 remain engaged.

As the sliding clutch member 86 is moved to the right, the following action takes place:

The teeth 82 and 87 engage to provide a positive couple between ring gear 34 through the clutch pack 70, intermediate gear 88 and clutch gear 86, to the side gear 54.

Thus the ring gear 34 and side gear 54 are locked together up to the point where the torque load on the axle shaft 58 will cause the clutch pack 70 to break away.

With the ring gear 34 and the side gear 54 locked together with pinion gears 62 cannot turn. Thus there is no differential action and axle shafts 58 and 60 rotate at the same speed.

THE LUBRICATION SYSTEM

The lower part of the axle banjo housing forms a lubricant reservoir 120, shown 90° out of position. Annular member 122 held by bolts 66 to differential case half 50 moves through the reservoir 120 to pick up lubricant. The lubricant which is picked up on the outside surface of 122 is removed by a non-abrasive, pliable scraper 126 mounted on the wall 128. A port 130 directs the lubricant from the scraper 126 to a flow chamber 132. A port 134 directs the lubricant to the bearing assembly 22 which supports the input pinion gear 30. A port 136 connects to passage 138 in hub 140 of the differential case half 50. This lubricates the bearing 146 and also directs lubricant into the side gears 54 and 56 and pinion gears 62. As the gears 54, 56 and 62 rotate, the lubricant moves through to chamber 148. From chamber 148 the lubricant flows through passages 150 to the outside of the clutch pack 70. The lubricant exhausts from the clutch pack 70 generally along the outside of the clutch member 86, back to the sump 120.

THE PROBLEM

It has been found in the design of FIG. 1 that centrifugal force throws the lubricant to the outside of the clutch pack 70 and thus the inside of the clutch pack does not receive adequate lubrication. Failures of the clutch pack have resulted.

The present invention provides improvements on the foregoing as follows:

1. Novel lubrication directing system to get lubricant into the inside of the clutch pack as well as the outside root diameter of gear 88, and thus provide improved lubrication during all conditions of operation;
2. A novel lubricant pick up and scraper arrangement of improved structure; and
3. A novel lubrication exhaust.

As shown in FIG. 2, axially oriented ports 152 are formed in the left half 48 of the differential case 47. The ports 152 lead from chamber 148 to the inside diameter of the clutch pack 70 as well as to the outside root diameter of gear 88. These passages 152 discharge directly onto the annular intermediate gear 88 and between each of the friction disks 72 and 74. This is made possible by opening the clearance between the inside of disks 74 and the outside root diameter of gear 88 to greater than specification. As the friction disks 72 and 74 rotate, their centrifugal force moves the lubricant from the inside out. This causes the lubricant to move radially outwardly along the abutting faces of the friction disks and out to the periphery. The friction disks are thus bathed in lubricant over their entire surfaces.

Additionally, the lubricant from the ports 152 moves along the inside diameter of the intermediate annular gear 88 to lubricate the teeth 90 and also the teeth 89 of the sliding clutch member 86.

The lubricant exhausts from the chamber 44 through radial ports 154 formed in the outer periphery of cup-shaped differential case 36. The size of ports 154 is such that lubricant feeds in through ports 152 faster than it exhausts through ports 154. Thus, ample lubricant is also directed to bearing 42 and the annular clutch member 86.

THE IMPROVED PICK UP AND SCRAPER ARRANGEMENT

In this improved invention, the differential case half 50 is formed with a cylindrical surface 156. The scraper 158 of non-abrasive pliable material is fastened to wall 128 and extends out a sufficient distance to provide a wiping contact with the cylindrical surface 156. This arrangement provides an improved flow of lubricant to the chamber 132 because the scraper 158 completely spans the mouth of the outlet passage 130. This actually provides a push to the lubricant as it travels through port 130 into chamber 132.

From the foregoing it will be evident that advantage is taken of the centrifugal forces generated within the clutch pack 70 itself to provide its own lubrication power.

We claim:

1. A lubrication system for a selectively engageable limited slip differential drive mechanism comprising:
    a housing having therein torque transmitting means including power input means drivingly connected to a differential case, said differential case containing a differential drive mechanism having at least two driven output gears,
    a differential case cover secured to the exterior of said differential case and forming a clutch housing with said differential case,
    a rotatable friction clutch assembly mounted within said clutch housing, said friction clutch assembly comprising;
    a friction clutch pack having at least one first friction clutch member secured to the inner walls of said clutch housing for rotation therewith and extending radially inwardly therefrom and at least one second friction clutch member fixed to a plurality of axially disposed circumferentially spaced external splines on an intermediate gear, said intermediate gear being internally splined for selective engagement wit one of said driven output gears, the spaces between said intermediate gear external splines and said second friction clutch member defining a plurality of axial fluid flow paths therebetween, said axial fluid flow paths having an inlet end, an outlet end leading to a member to be lubricated and a plurality of radial outlets leading to said first and second friction clutch members, and means for resiliently biasing said first and second friction clutch members into frictional contact,
    a slidable clutch member operable between engaged and disengaged positions for selectively engaging said intermediate gear and said one of said driven output gears, said clutch means in the engaged position frictionally drivingly connecting said power input means and said one output gear,
    said differential housing including a lubricant reservoir,
    lubricant pick-up means movable through said reservoir to pick up lubricant and transport the lubricant from said reservoir,
    lubricant directing means engageable with said pick-up means for removing lubricant from said pick-up means,
    passage means associated with said pick-up means and extending into said clutch housing for moving lubricant into said inlet ends of said axial fluid flow paths for lubrication of said clutch pack radially outwardly through said friction members by the centrifugal force of the rotating clutch assembly, and
    exhaust port means through said clutch housing interposed said clutch pack and said lubricant reservoir, said exhaust port means of smaller transverse area than said axial fluid flow paths providing a restriction to lubricant flow through said first and second friction clutch members thereby assuring a portion of the lubricant in said axial fluid flow paths said first and second friction clutch members to the member to be lubricated.

2. The invention according to claim 1 wherein said passage means associated with said directing means leads into the central portion of said clutch housing, exhausting into contact with said intermediate gear and the inside diameter of said friction clutch pack, and the clearance between the inside of the second friction clutch member and the outer surface of said intermediate gear being sufficient to pass the required supply of lubricant.

* * * * *